United States Patent [19]

Arai

[11] 3,903,365

[45] Sept. 2, 1975

[54] SYNCHRONIZING SEPARATOR CIRCUIT

[75] Inventor: Takeshi Arai, Higashiosaka, Japan

[73] Assignee: Sanyo Electric Co., Ltd., Japan

[22] Filed: Feb. 28, 1974

[21] Appl. No.: 446,959

[30] Foreign Application Priority Data

Mar. 5, 1973 Japan .............................. 48-26319

[52] U.S. Cl. .............................................. 178/7.3 S
[51] Int. Cl.² ............................................ H04N 3/16
[58] Field of Search ......................... 178/7.3 S, 7.5 S

[56] References Cited

UNITED STATES PATENTS

| | | | |
|---|---|---|---|
| 3,290,441 | 12/1966 | Humphrey | 178/7.5 S |
| 3,569,844 | 3/1971 | Lynn | 178/7.3 S |
| 3,809,808 | 5/1974 | Arpin | 178/7.3 S |

*Primary Examiner*—Richard Murray
*Attorney, Agent, or Firm*—Staas & Halsey

[57] ABSTRACT

A synchronizing signal separator circuit in a television apparatus such as a television receiver corrects the distortion of a composite video signal including a synchronizing signal component, before amplitude-separating the corrected composite video signal to derive the synchronizing signal component. For this purpose, a peak value of the synchronizing signal component in the composite video signal is detected to derive the envelope of the peak value. The envelope is then inverted and added to the composite video signal. In a preferred embodiment, a direct current closed loop includes means for detecting the peak value of the synchronizing signal component and deriving the envelope thereof and variable impedance means connected in shunt with a d.c. signal path conducting the composite video signal, which responds to the envelope of the peak value as a control voltage to vary the impedance as a function of variations in the value of the peak envelope. As a result, the waveform of the peak amplitudes of the synchronizing signal component is leveled.

5 Claims, 7 Drawing Figures

SYNCHRONIZING SEPARATOR CIRCUIT

BACKGROUND OF THE INVENTION

1. Field of the Invention

This invention relates to a synchronizing separator circuit in a television apparatus such as a television receiver, and more particularly to a circuit for correcting the distortion of a composite video signal including a synchronizing signal component.

2. Description of the Prior Art

In a television receiver, in general, a composite video signal including a synchronizing signal component is applied to a signal synchronizing separator circuit, wherein the synchronizing signal component is amplitude-separated from the composite video signal for use as synchronizing signals in horizontal and vertical deflection circuits.

Referring now to FIG. 1, there is illustrated a schematic diagram of a portion of a conventional television circuit. There is provided a video detector 1 for detecting an intermediate frequency video signal from an intermediate frequency amplifier (not shown), and for applying a detected output signal or a composite video signal through a video amplifier 2 to a cathode ray tube (not shown) and through an amplifier 3 to a synchronizing separator circuit 4, which comprises a transistor TR1, the base of which is coupled to a time constant circuit implemented by a coupling capacitor C1, and resistors R1 and R2. The time constant is properly chosen to set the operating point of the transistor TR1, so that a synchronizing signal separating operation can be done smoothly.

FIG. 2 illustrates the operation of the synchronizing signal separator circuit 4. The synchronizing signal from the collector of the transistor TR1, the waveform of which is shown in FIG. 2(*b*), is amplitude-separated from the composite video signal from the amplifier 3, the waveform of which is shown in FIG. 2(*a*).

Usually, however, the composite video signal is not necessarily of a preferred waveform for the purpose of synchronizing separating operation, because of influence of the transmission system between the broadcasting station and the receiver, influence of the transmission path of the video signal in the receiver, influence of the contents of the video signal component per se, or the like. FIG. 3(*a*) shows a waveform of a normal composite video signal to be applied to the synchronizing signal separating transistor TR1, where Vt denotes a vertical interval i.e. a half period of one frame time. FIG. 3(*b*) shows a distortion of the composite video signal applied to the input of the synchronizing signal separator circuit 4 for the case where the capacitance of a coupling capacitor interposed in a signal transmission path between the video detector 1 and the amplifier 3 is of a small value. It is seen that the waveform has been distorted because of the influence of the contents of the video signal component per se. FIG. 3(*c*) shows an example of a distortion, referred to as "airplane fluttering", which occurs in case of the presence of obstacles, such as an airplane or the like.

It is not possible to select a time constant of the synchronizing separator circuit 4 which will avoid all of such various distortions of the composite video signal, and thereby maintain a condition in which the said circuit 4 performs a good operation. Therefore, it can happen that the video signal component of the composite video signal is mixed with the synchronizing signal or the synchronizing signal output is absent.

SUMMARY OF THE INVENTION

Briefly described, the circuit of this invention comprises means for providing an output representative of an envelope of the peak value of the synchronizing signal component of the composite video signal, and means for combining the envelope output and the composite video signal in a sense opposite to each other so as to compensate the composite video signal. As a result, a composite video signal having a constant peak value of the synchronizing signal component is provided. The synchronizing signal then is amplitude-separated from the compensated composite video signal.

Accordingly, an object of this invention is to provide an improved synchronizing signal separator circuit in a television apparatus.

Another object of this invention is to provide a synchronizing separator circuit in a television receiver which derives precisely the synchronizing signal component from the composite video signal irrespective of the distortion thereof.

A still further object of this invention is to provide a synchronizing signal separator circuit in a television apparatus which comprises a circuit for correcting the distortion of the composite video signal, whereby stabilization of the synchronizing signal separator circuit is achieved.

These and other objects of this invention will become apparent from the following description, taken together with the accompanying drawings.

BRIEF DESCRIPTION OF THE DRAWINGS

In the figures, like reference characters refer to like parts.

DESCRIPTION OF THE PREFERRED EMBODIMENTS

Figure 1:
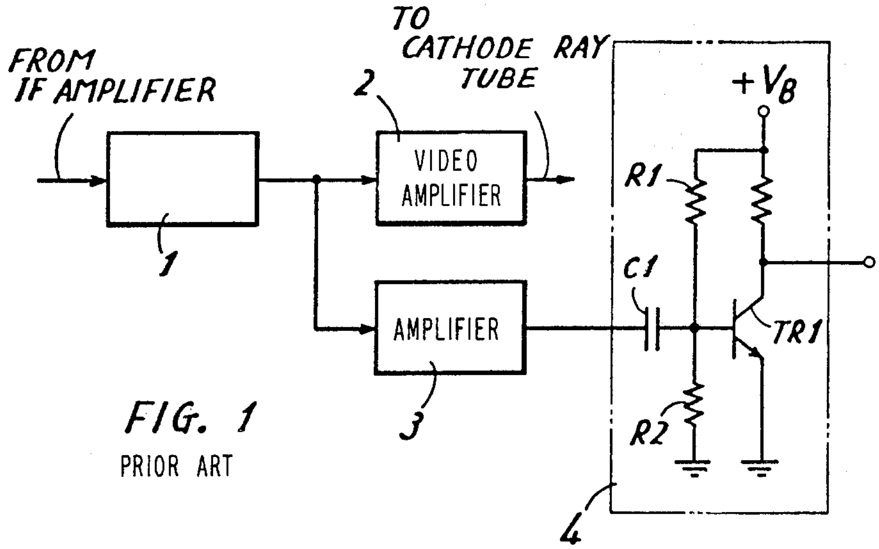
FIG. 1 is a schematic diagram of a portion of a conventional television receiver including a prior art synchronizing signal separator circuit.
Figure 2:
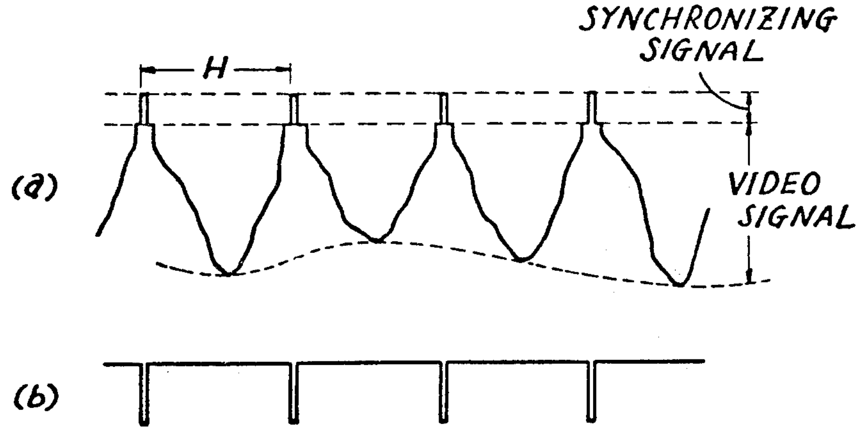
FIG. 2 is a graph illustrating the operation of a synchronizing separator circuit in a normal condition.
Figure 3:
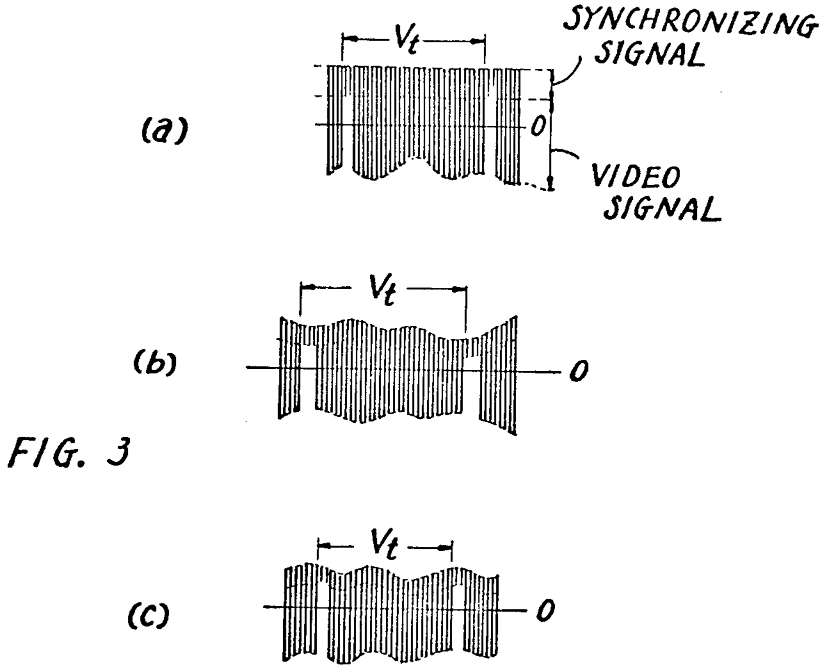
FIG. 3 is a graph illustrating a composite video signal on a reduced time basis.
Figure 4:
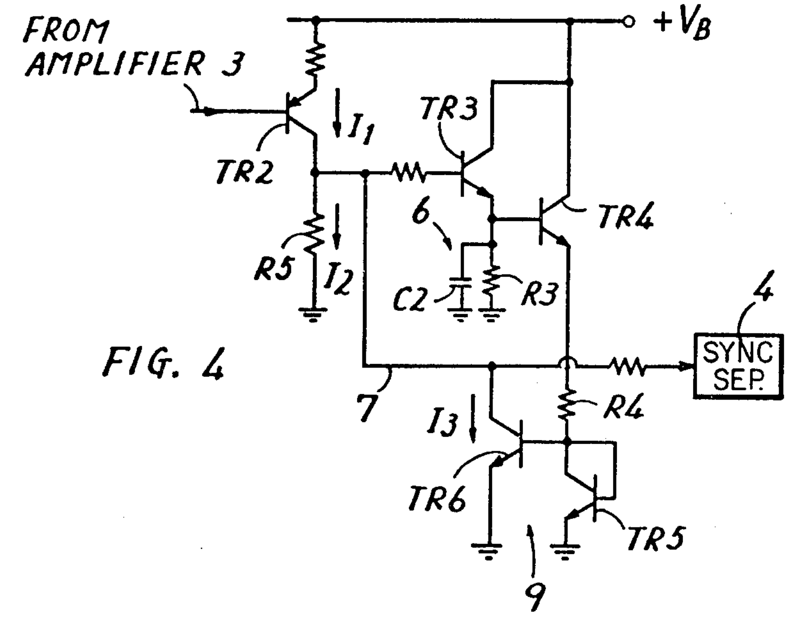
FIG. 4 is a schematic diagram of a synchronizing signal separator circuit of this invention.

Referring now to FIG. 4, there is illustrated a synchronizing signal separator circuit which can be used in a typical television receiver which comprises the video detector 1, the video amplifier 2 and the amplifier 3 as shown in FIG. 1. The composite video signal is fed from the amplifier 3 to the base of PNP type transistor TR2 having its collector coupled to the base of an NPN type transistor TR3 serving as a rectifying means, so that the peak value of the synchronizing signal component of the composite video signal can pass through the rectifying transistor TR3. The emitter of the transistor TR3 is coupled to a low pass filter 6 implemented by a capacitor C2 and a resistor R2 connected across the capacitor C2. The time constant, that is, the product of capacitance of the capacitor C2 and resistance of the resistor R3, is less than one period of the possible periodically drifting envelope of the peak value of the synchronizing signal component of the composite video signal from the amplifier 3, but at least as large as one horizontal scanning period, designated H in FIG. 2(*a*), which is nearly 63.5 $\mu$ sec ($\approx$ 1/15700 sec) in the Japanese broadcasting system, and preferably fifty times larger than the horizontal scanning period H. In other words, the cut-off frequency of the low pass filter 6 is lower than the drifting frequency of the envelope of the peak value of the synchronizing signal of the composite video signal from the amplifier 3, but higher than the line frequency (15700 Hz in Japanese TV system), and preferably lower than one-fiftieth of the line frequency. Accordingly, the envelope of the peak value of the synchronizing signal component appears at the base of an emitter follower transistor TR4 which is provided in order not to cause the low pass filter 6 to be adversely affected by a resistor R4.

The output from the emitter follower transistor TR4 is applied through the resistor R4 to a variable impedance means 9 implemented by transistors TR5 and TR6 which have bases coupled commonly to the resistor R4 and have emitters grounded commonly. The voltage between the emitter and the base of the transistors TR5 is equal to that of the transistor TR6, and thus the collector current $I_3$ of the transistors TR5 and TR6 are equal.

The collector of the transistor TR2 is connected to the ground through a resistor R5 and through the transistor TR6 individually. Circuit components of this embodiments in FIG. 4 are adapted so that the current $I_1$ through the collector-emitter path of the transistor TR2 is substantially equal to the sum of a current $I_2$ flowing through the resistor R5 and a current $I_3$ flowing through the transistor TR6, that is, $I_1 \approx I_2 + I_3$.

As a result, transistor TR6 which is seen to be connected in shunt with the d.c. signal path 7 serves to shunt a portion of the current $I_1$ conducted by transistor TR2, that portion particularly designated $I_3$, which varies in amount as a function of the control voltage applied to transistor TR6 and thus in accordance with the variations in value of the envelope of the detected peak value of the synchronizing signal component of the composite video signal. The elements including transistor TR3, low pass filter 6, transistor TR4, and variable impedance means 9 comprising transistors TR5 and TR6 form a direct current closed loop for stabilizing the peak value of the composite video signal developed as a voltage across resistor R5. Voltage across the resistor R5 is applied through a path 7 for transferring the composite video signal to the circuit 4, which may be substantially the same as the amplitude controlled synchronizing signal separator circuit 4 (i.e., sync separator) in FIG. 1.

Figure 5:
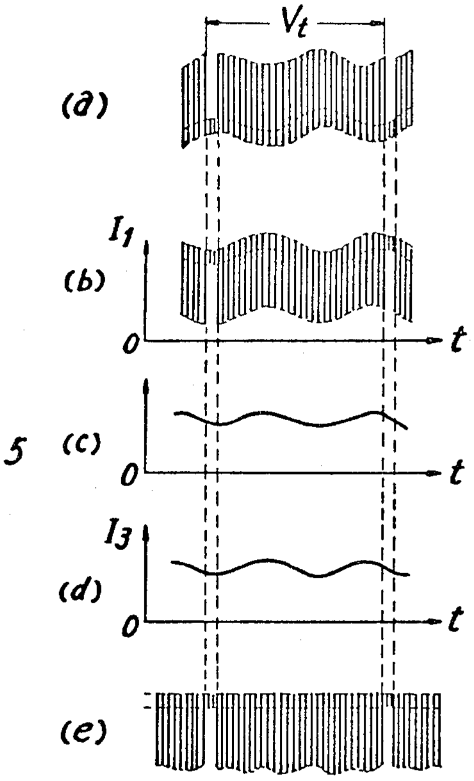
FIG. 5 is a graph illustrating the operation of the synchronizing signal separator in FIG. 4.

Referring to FIG. 5, there is illustrated the operation of the synchronizing signal separator circuit of FIG. 4. When the composite video signal, having a distorted waveform as shown in FIG. 5(*a*), is applied from the amplifier 3 to the base of the transistor TR2 where the composite video signal is inverted, the current $I_1$ is of such a waveform as shown in FIG. 5(*b*). Accordingly, the envelope output voltage from the low pass filter 6 is of a wave form shown in FIG. 5(*c*), and thus the current $I_3$ through the transistor TR6 is of a waveform shown in FIG. 5(*d*). As pointed out previously, $I_2 \approx I_1 - I_3$. As a result, the voltage across the resistor R5 is of the waveform shown in FIG. 5(*e*) having the peak value of the synchronizing signal component levelled or evened irrespective of the distortion thereof as shown in FIG. 5(*a*).

Figure 6:
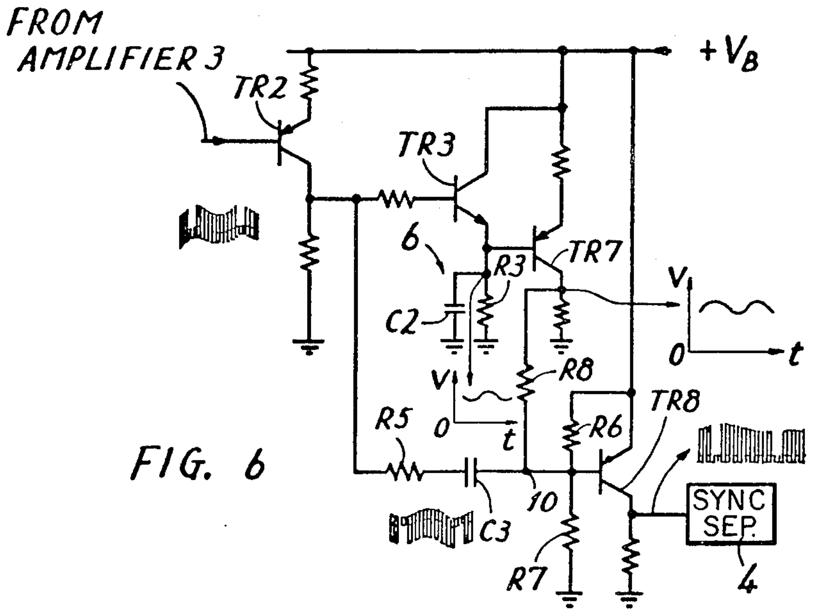
FIG. 6 is a schematic diagram of an alternative embodiment of this invention.

FIG. 6 shows an alternative embodiment of this invention. The construction of FIG. 6 is partially identical to that of the circuit previously described with respect to FIG. 4. A notable exception is that the output from the low pass filter 6 implemented by the capacitor C2 and the resistor R3 is inverted by means of a transistor TR7, an output from which is combined with the composite video signal through a capacitor C3 from the transistor TR2 as a function of resistance coupling comprising resistors R5, R6, R7 and R8. It should be noted that the envelope output at the collector of the transistor TR7 and the composite video signal through the capacitor C3 are in a direction opposite to each other. Accordingly, the peak value of the synchronizing signal component of the resultant composite video signal at a node 10 is levelled to be applied through a transistor TR8 to an amplitude controlled sync separator circuit 4.

Figure 7:
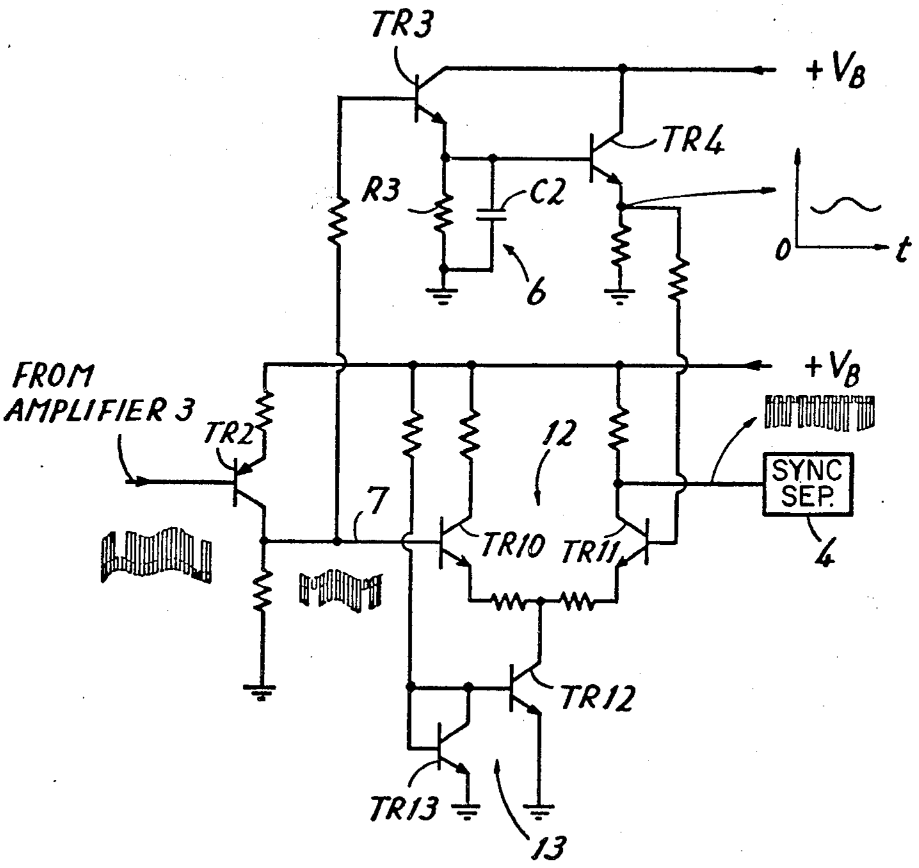
FIG. 7 is a schematic diagram of another alternative embodiment of this invention.

FIG. 7 shows another embodiment of this invention. Although in FIG. 4 the variable impedance means implemented by transistors TR5 and TR6 is interposed in shunt with the transferring path 7, this FIG. 7 embodiment employs a differential amplifier 12 as an alternative variable impedance means in series with the transferring path 7. The differential amplifier 12 comprises a transistor TR10 having its base connected to the path 7, a transistor TR11 having its base connected to the emitter of the emitter follower transistor TR4, and a constant-current circuit 13 implemented by transistors TR12 and TR13 for supplying constant current to the emitters of the transistors TR10 and TR11. The remaining construction is substantially identical to that of FIG. 4. As a result, the differential amplifier 12 causes the composite video signal on the path 7 to have subtracted therefrom the envelope output from the emitter follower transistor TR4, so that the distortion of the composite video signal on the path 7 is corrected and the levelled peak value of the synchronizing signal component of the composite video signal appears at the collector of the transistor TR11 which is connected to the amplitude-sync separating circuit 4.

Alternatively, the transistor TR3 in FIGS. 4, 6 and 7 may be a diode directionally coupled so as to provide the peak value of the synchronizing signal component of the composite video signal.

Although the invention has been described and illustrated in detail as employed in a television receiver, it is to be clearly understood that the same is by way of illustration and example only and is not to be taken by way of limitation, and this invention can be employed in other television apparatus such as a video tape recorder, the spirit and scope of this invention being limited only by the terms of the appended claims.

What is claimed is:

1. A circuit for use in a television receiver, comprising:

means for amplifying said composite video signal and producing an amplified composite video signal output, a direct current signal path for receiving and transferring said amplified composite video signal output of said amplifying means, a direct current closed loop comprising rectifying means, a low pass filter, variable impedance means, and controlling means, said rectifying means being connected to said direct current signal path to receive said amplified composite video signal therefrom and to rectify said amplified composite video signal and provide an output corresponding to the peak value of the synchronizing signal component of said amplified, composite video signal, said low pass filter being coupled to said rectifying means to receive said output thereof and provide an output representative of the envelope of the peak value of said synchronizing component of said composite video signal, said controlling means receiving said envelope output of said low pass filter and applying said envelope output as a control voltage to said variable impedance means, and said variable impedance means being connected to shunt with said direct current signal path and being responsive to said control voltage supplied thereto by said controlling means to vary the impedance value thereof as a function of said control voltage, thereby to compensate for amplitude variation distortions of said composite video signal transferred on said direct current signal path, and means coupled to said direct current path for receiving said compensated composite video signal from said path and amplitude separating said synchronizing signal component from said compensated composite video signal.

2. A signal processing circuit as recited in claim 1 wherein said low pass filter has a cut-off frequency lower than the line frequency of said television receiver.

3. A signal processing circuit as recited in claim 1 wherein said low pass filter has a cut-off frequency lower than one-fiftieth of the line frequency of said television receiver.

4. A signal processing circuit as recited in claim 1 wherein said variable impedance means comprises a transistor connected in parallel with said direct current signal path.

5. A signal processing circuit as recited in claim 4 wherein said controlling means comprises:

an emitter follower transistor for receiving the envelope output of said low pass filter, and a direct current circuit including a resistor connected in series with the output of said emitter follower transistor and with the input of said parallel connected transistor to provide said envelope output of said low pass filter as an input to said parallel connected transistor.

* * * * *